United States Patent
Venugopal et al.

(10) Patent No.: US 12,333,183 B2
(45) Date of Patent: Jun. 17, 2025

(54) DATA STORAGE DEVICE AND METHOD FOR EXECUTING A LOW-PRIORITY SPECULATIVE READ COMMAND FROM A HOST

(71) Applicant: Western Digital Technologies, Inc., San Jose, CA (US)

(72) Inventors: Abhinandan Venugopal, Bangalore (IN); Amit Sharma, Bengaluru (IN); Anindita Chakrabarty, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 387 days.

(21) Appl. No.: 17/709,699

(22) Filed: Mar. 31, 2022

(65) Prior Publication Data

US 2023/0315335 A1    Oct. 5, 2023

(51) Int. Cl.
    *G06F 3/06* (2006.01)
(52) U.S. Cl.
    CPC .......... *G06F 3/0656* (2013.01); *G06F 3/0604* (2013.01); *G06F 3/061* (2013.01); *G06F 3/0659* (2013.01); *G06F 3/0679* (2013.01)
(58) Field of Classification Search
    CPC .... G06F 3/0656; G06F 3/0604; G06F 3/0659; G06F 3/0679; G06F 3/061
    See application file for complete search history.

(56) References Cited

U.S. PATENT DOCUMENTS

| | | | |
|---|---|---|---|
| 7,238,218 B2 | 7/2007 | Hepner et al. | |
| 8,849,758 B1* | 9/2014 | Sivasubramanian | ... G06F 3/061 |
| | | | 707/655 |
| 9,253,277 B2 | 2/2016 | Hughes et al. | |
| 10,025,532 B2 | 7/2018 | Manohar et al. | |
| 10,719,441 B1* | 7/2020 | Yin | ...... G06F 12/0802 |
| 11,816,103 B1* | 11/2023 | Goel | ................. G06F 16/24552 |
| 2002/0199079 A1 | 12/2002 | Gonzales et al. | |
| 2003/0088740 A1 | 5/2003 | Henry et al. | |
| 2019/0004954 A1* | 1/2019 | Kumar | ................. G06F 12/0862 |
| 2021/0247982 A1* | 8/2021 | Cockcroft | ............. G06F 9/3836 |
| 2021/0390053 A1* | 12/2021 | Roberts | ............... G06F 12/0862 |

OTHER PUBLICATIONS

"NVM Expressv Base Specification," Revision 1.4; NVM Express Workgroup; Jun. 10, 2019; 403 pages.

* cited by examiner

*Primary Examiner* — Hosain T Alam
*Assistant Examiner* — Alan Otto
(74) *Attorney, Agent, or Firm* — Crowell & Moring LLP

(57) ABSTRACT

A data storage device receives a speculative read command from a host identifying logical block addresses. The speculative read command is not required be to executed within a certain amount of time or even at all. The data storage device at least partially executes the speculative read command in response to determining that such execution will not reduce performance of the data storage device. At least partially executing the speculative read command causes data associated with at least some of the logical block addresses to be read from the non-volatile memory and stored in at least one buffer. Other embodiments are possible, and each of the embodiments can be used alone or together in combination.

20 Claims, 12 Drawing Sheets

DATA STORAGE DEVICE AND METHOD FOR EXECUTING A LOW-PRIORITY SPECULATIVE READ COMMAND FROM A HOST

BACKGROUND

A host can write and read data from a memory in a data storage device. The host can access data in the memory in long ranges, which can lead to efficient, sequential data patterns. However, if the host's data requirement is intermittent and the data range varies frequently, this can lead to high access times for performance-critical data, which can result in lower system performance and reduce quality of service.

DETAILED DESCRIPTION

Overview

Figure 1A:
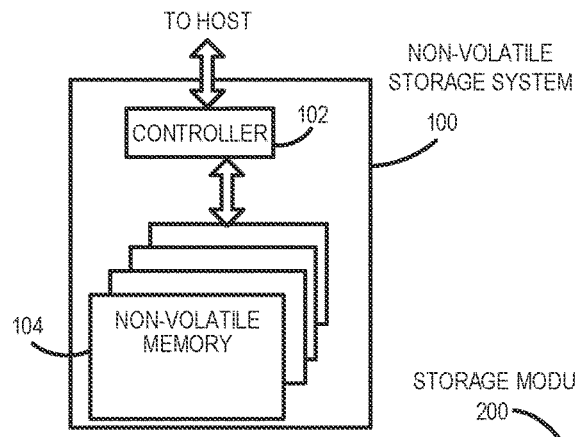
FIG. 1A is a block diagram of a data storage device of an embodiment.

By way of introduction, the below embodiments relate to a data storage device and method for executing a low-priority speculative read command from a host. In one embodiment, a data storage device is provided comprising a non-volatile memory and a controller. The controller is configured to receive a speculative read command from a host identifying logical block addresses, wherein the speculative read command is not required be to executed within a certain amount of time or even at all; and at least partially execute the speculative read command in response to determining that such execution will not reduce performance of the data storage device, wherein at least partially executing the speculative read command causes data associated with at least some of the logical block addresses to be read from the non-volatile memory and stored in at least one buffer.

In some embodiments, wherein the controller is further configured to allow the host to access the data stored in the at least one buffer.

In some embodiments, the speculative read command is at least partially executed during idle time of the data storage device.

In some embodiments, the speculative read command is at least partially executed in response to the data storage device having surplus bandwidth.

In some embodiments, the speculative read command is at least partially executed in response to the at least one buffer being available.

In some embodiments, the speculative read command is at least partially executed prior to the data storage device entering a low-power or sleep mode.

In some embodiments, the controller is further configured to at least partially execute the speculative read command intermediately between executing non-speculative read commands.

In some embodiments, the at least one buffer is in the data storage device.

In some embodiments, the at least one buffer is in the host.

In some embodiments, the at least one buffer comprises a plurality of buffers, one of which is in the data storage device and another one of which is in the host.

In some embodiments, the controller is further configured to replace at least some portions of the data in the at least one buffer that are lost when an area of the at least one buffer storing the at least some portions of the data is reclaimed.

In some embodiments, the controller is further configured to place the speculative read command in a low-priority queue.

In some embodiments, the non-volatile memory comprises a three-dimensional memory.

In another embodiment, a method is provided that is performed in a data storage device comprising a non-volatile memory. The method comprises: receiving a low-priority pre-fetch command from a host; determining if the low-priority pre-fetch command can be executed, in whole or in part, without affecting performance of a higher-priority command; and in response to determining that the low-priority pre-fetch command can be executed, in whole or in part, without affecting performance of the higher-priority command, execute at least part of the low-priority pre-fetch command by: reading data from the non-volatile memory; and caching the data in a volatile memory.

In some embodiments, the method further comprises: in response to later receiving a read command from the host for data identified in the pre-fetch command, only reading data from the non-volatile memory that was not cached in the volatile memory.

In some embodiments, the volatile memory is located at least partially in the data storage device.

In some embodiments, the volatile memory is located at least partially in the host.

In some embodiments, the method further comprises: converting the low-priority pre-fetch command into a higher priority read command in response to a request from the host.

In some embodiments, the method further comprises: invalidating the low-priority pre-fetch command and replacing it with a higher priority read command in response to a request from the host.

In another embodiment, a data storage device is provided comprising: a non-volatile memory; means for receiving a non-deterministic speculative read command from a host identifying logical block addresses; and means for at least partially executing the speculative read command in response to determining that such execution will not reduce performance of the data storage device, wherein at least partially executing the speculative read command causes data associated with at least some of the logical block addresses to be read from the non-volatile memory and stored in at least one buffer.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
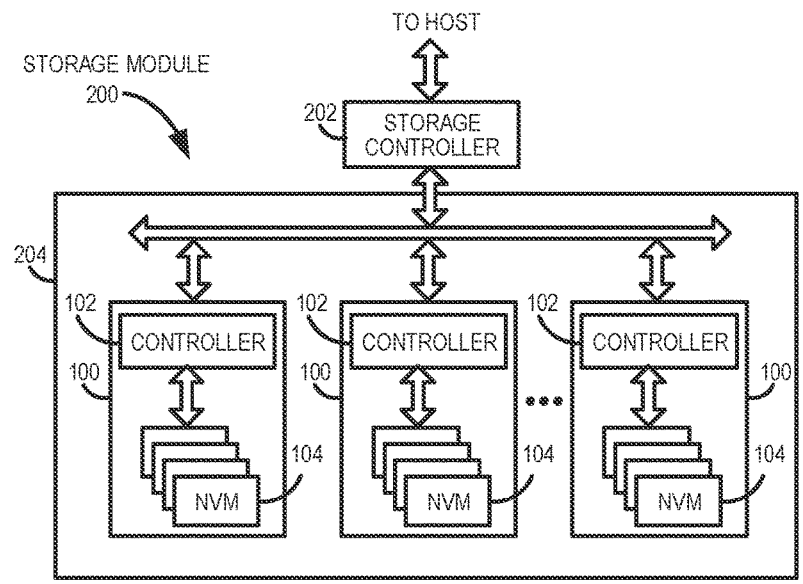
FIG. 1B is a block diagram illustrating a storage module of an embodiment.
Figure 1C:
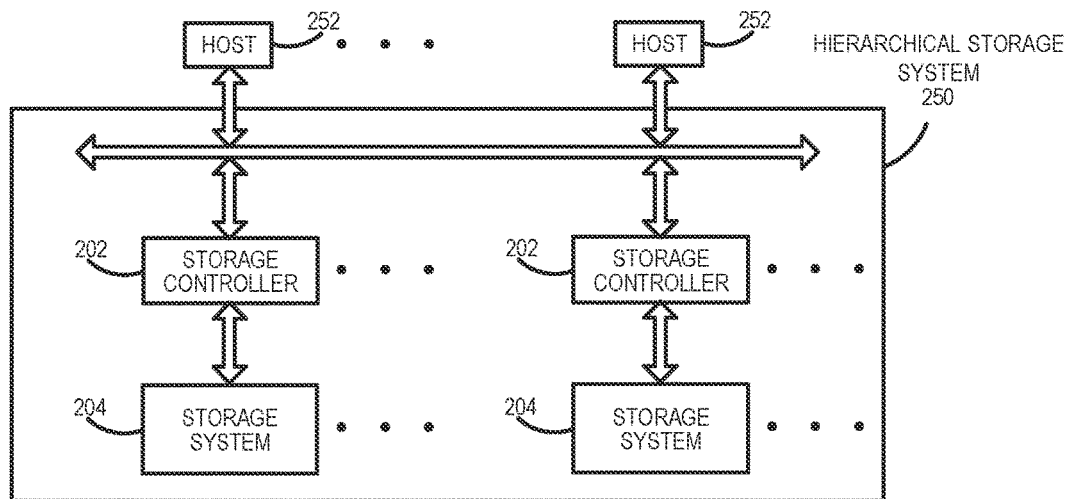
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cells (QLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
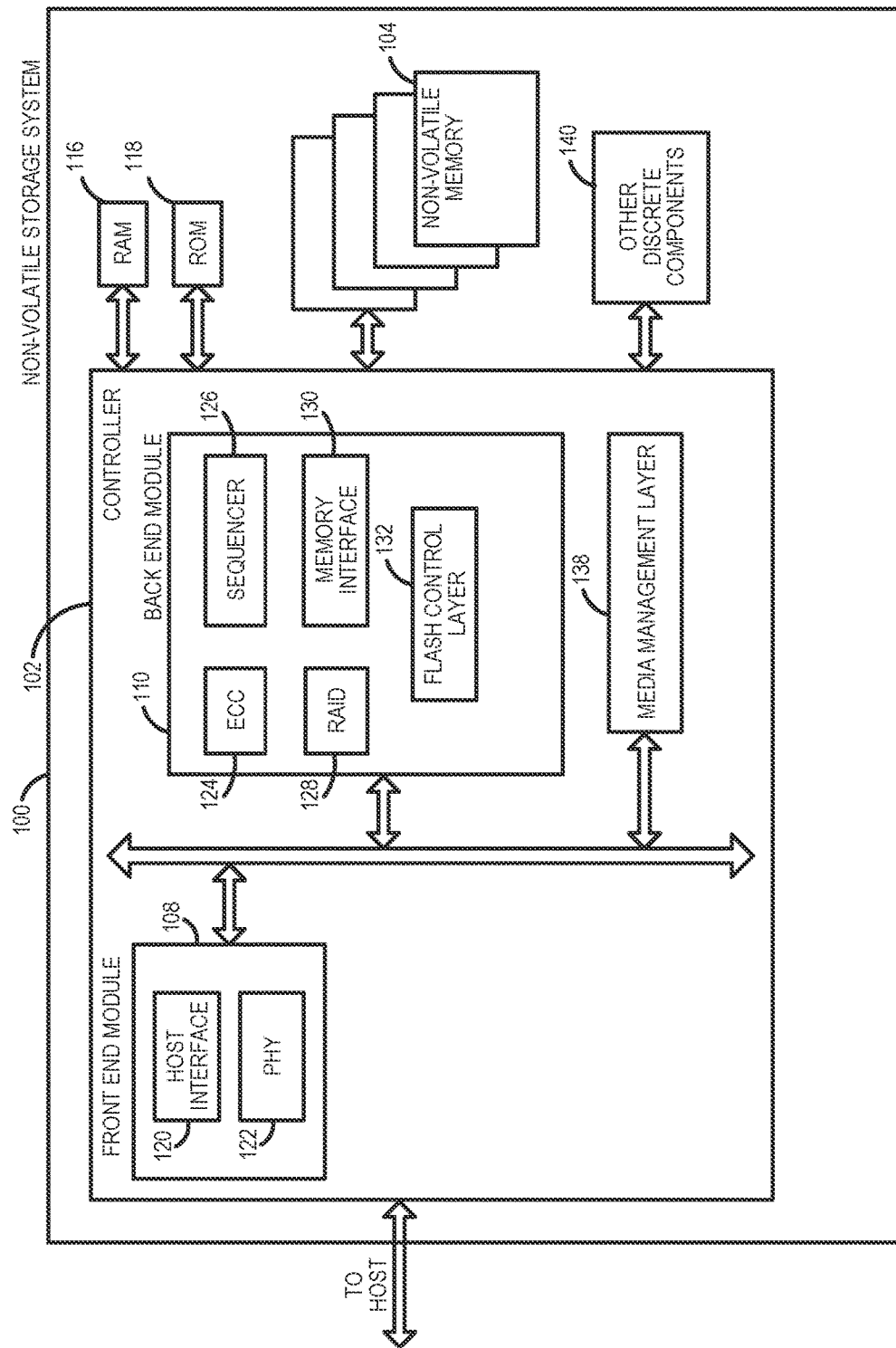
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
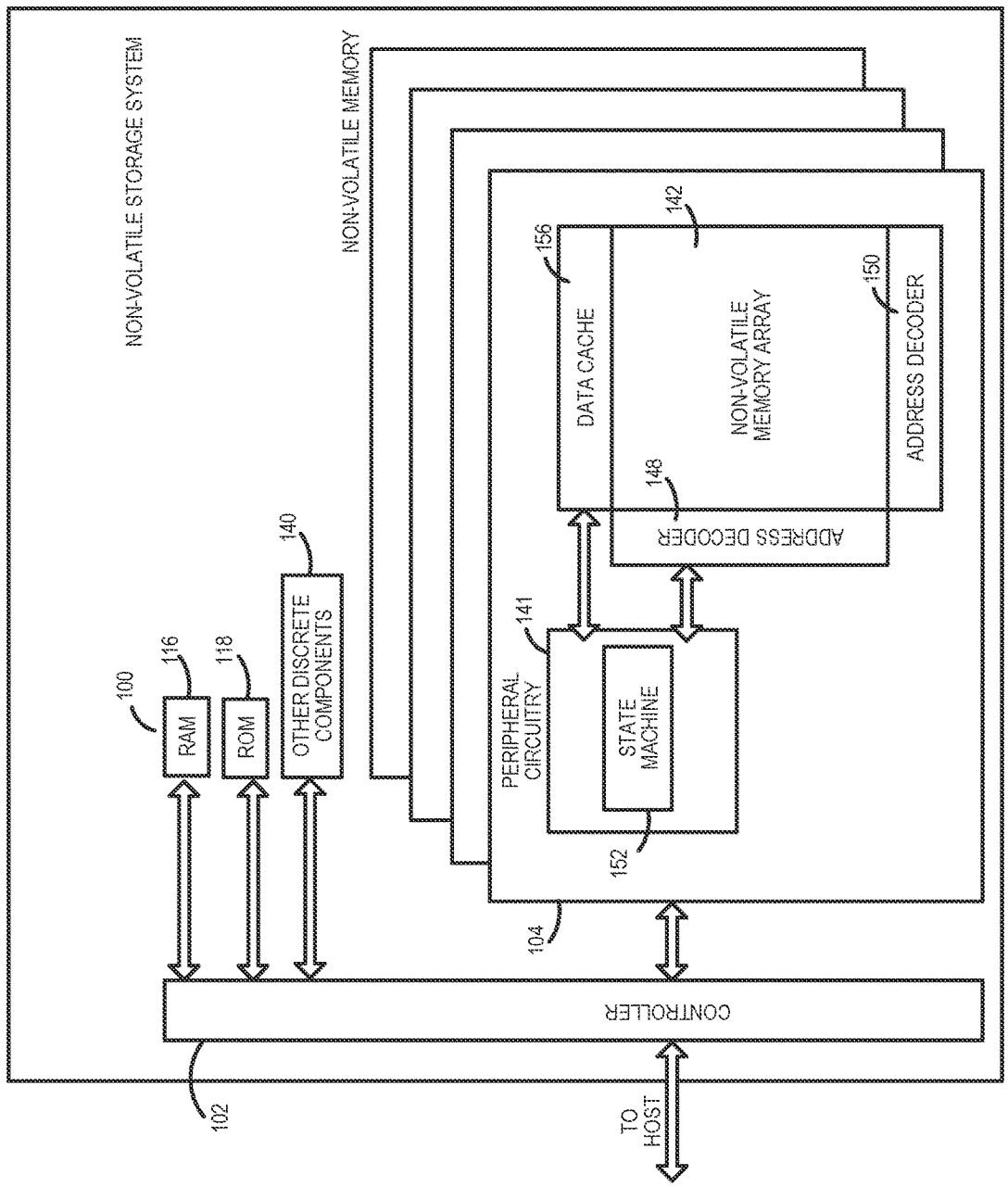
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
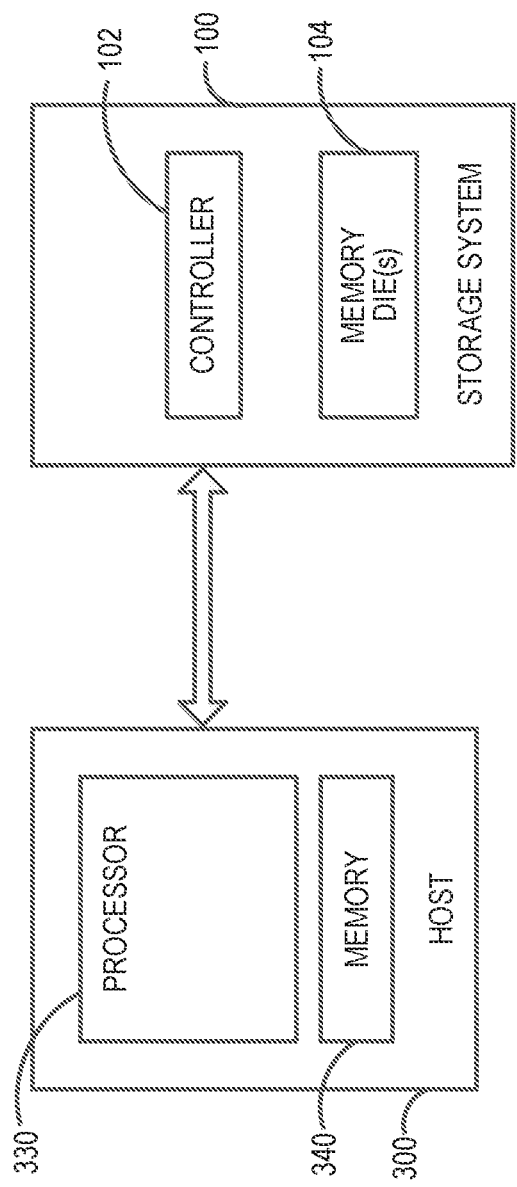
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
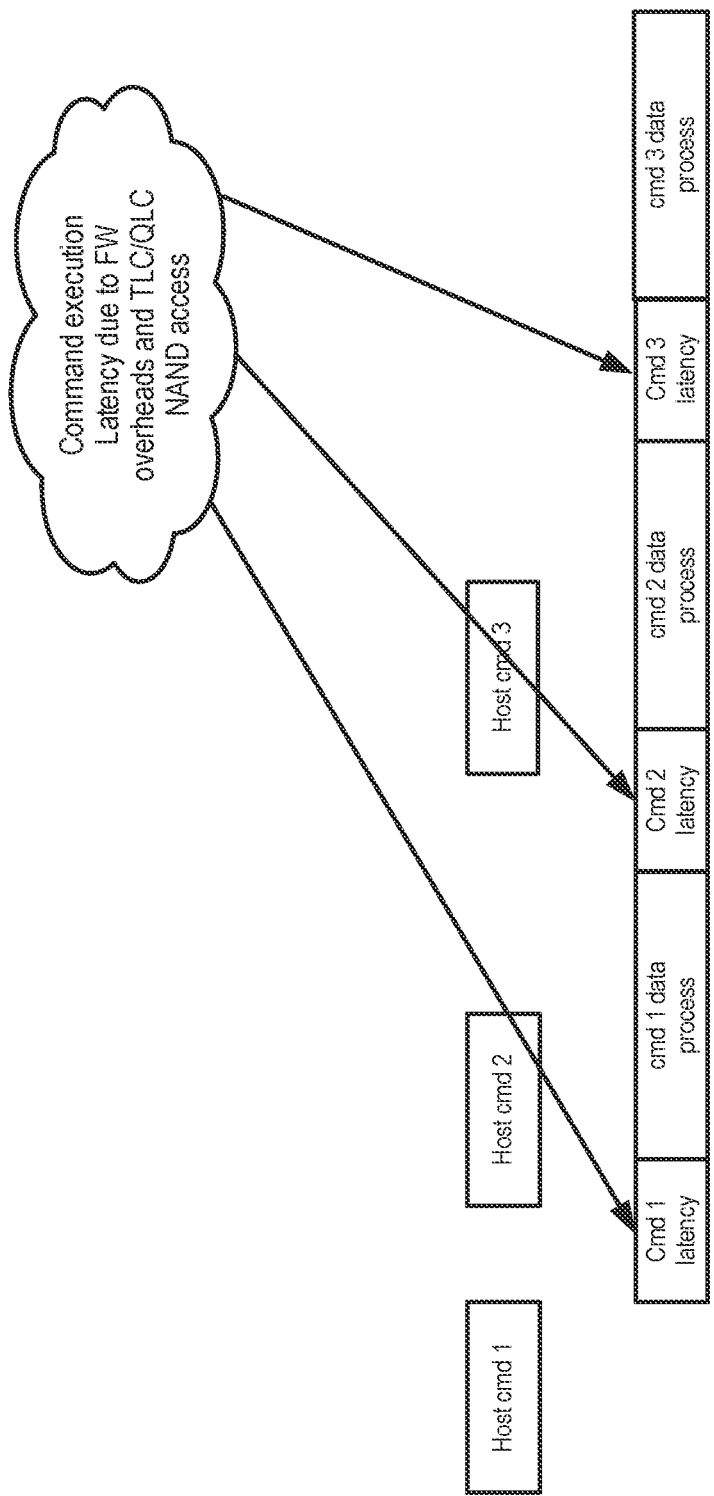
FIG. 4 is a diagram that illustrates an immediate data requirement of a host of an embodiment.

As mentioned above, a host can write and read data from a memory in a data storage device. The host can access data in the memory in long ranges, which can lead to efficient, sequential data patterns. However, if the host's data requirement is intermittent and the data range varies frequently, this can lead to high access times for performance-critical data. This is illustrated in FIG. 4. As shown in FIG. 4, the host issues three separate host commands. The execution of each host command is associated with a command execution latency due to, for example, firmware overheads and TLC/QLC memory accesses.

Data storage devices usually work on data patterns and have algorithms to optimize flows for performance-critical host data requirements. Many times, the host will require the data immediately, and the data storage device would not have a pre-defined data pattern available. Also, if the host requires data of a shorter range, time would be required to process such data range changes, which results in lower performance. For example, while Windows (or another operation system) is booting, the boot block will be required first followed by file system blocks and so on. Such data is of a shorter range and lies at different regions in the memory. As a result, storage data access will be slower and result into low host performance.

Figure 5:
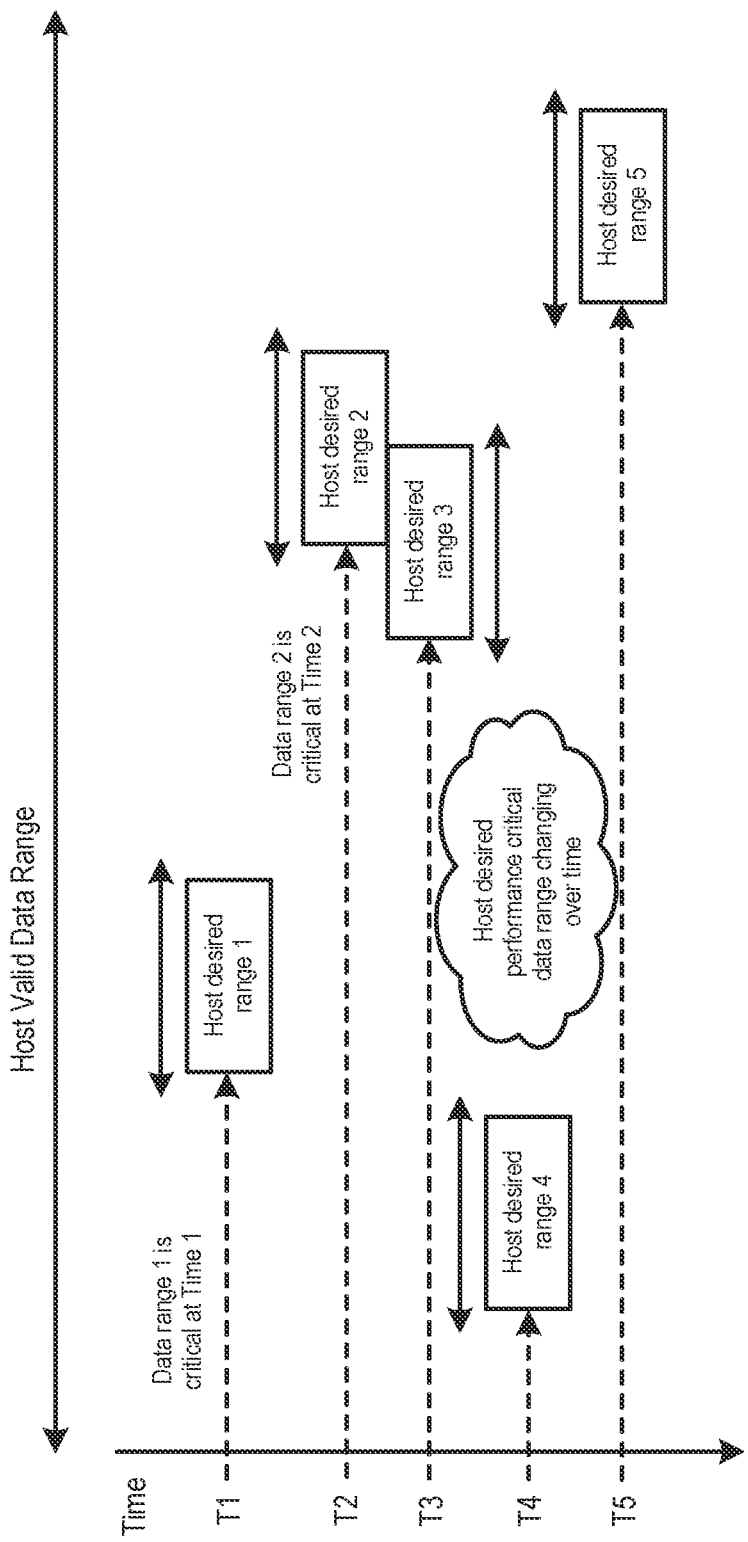
FIG. 5 is a diagram that illustrates a host dynamic data range requirement of an embodiment.

Many hosts work on patterns where sequential/random data access is required on a range of data for some time while a different range of data is required at other times. This host dynamic performance range requirement is illustrated in FIG. 5, which shows the critical data ranges changing over time. Such dynamic data requirement from the host results in higher processing latencies. That is, the more the intermittency of data, the more penalty would be paid to change firmware access schemes. This can result in low host performance.

One such use case is in minimalist systems like cameras. In professional photography, a typical use case is to access the last few shots to check if the desired results have been achieved. From the data storage device's point of view, this would mean the host would need to pre-fetch different sets of data at different points in time. While such systems may predict data to be pre-fetched, they may not have advanced pre-fetch algorithms. So, the possibility of improving system performance is minimal unlike complex systems like Windows. In such camera systems without pre-fetch schemes, the lag would be observed while accessing previously-written data for a quick check. This impacts quality of service (QoS).

Some architectures address this by having data storage partitions in the memory to effectively balance performance, endurance, and capacity. Generally, these partitions are categorized as: (1) a boot/Flashware/system information area (in SLC blocks), (2) a management area (e.g., with address translation tables and block status tables) (in SLC blocks), and (3) a main storage area (in TLC/QLC blocks). While the main storage area caters to host data, owing to the fact that TLC/QLC blocks are used, they are significantly slower than their SLC counterparts. In instances where the host changes the range of data frequently, the turn-around time will be higher. To counter such limitation, an intermediate storage area can be used.

Figure 6:
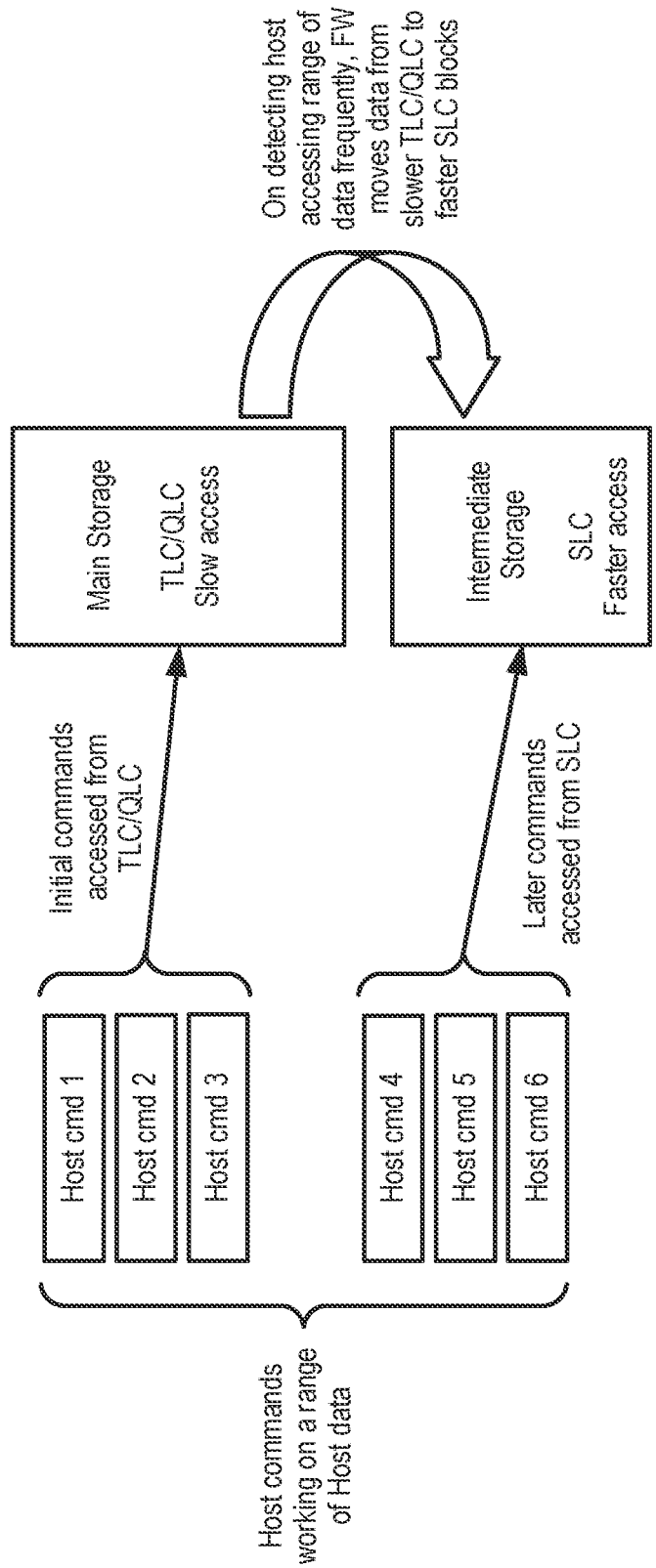
FIG. 6 is a diagram of intermediate storage of an embodiment.
Figure 7:
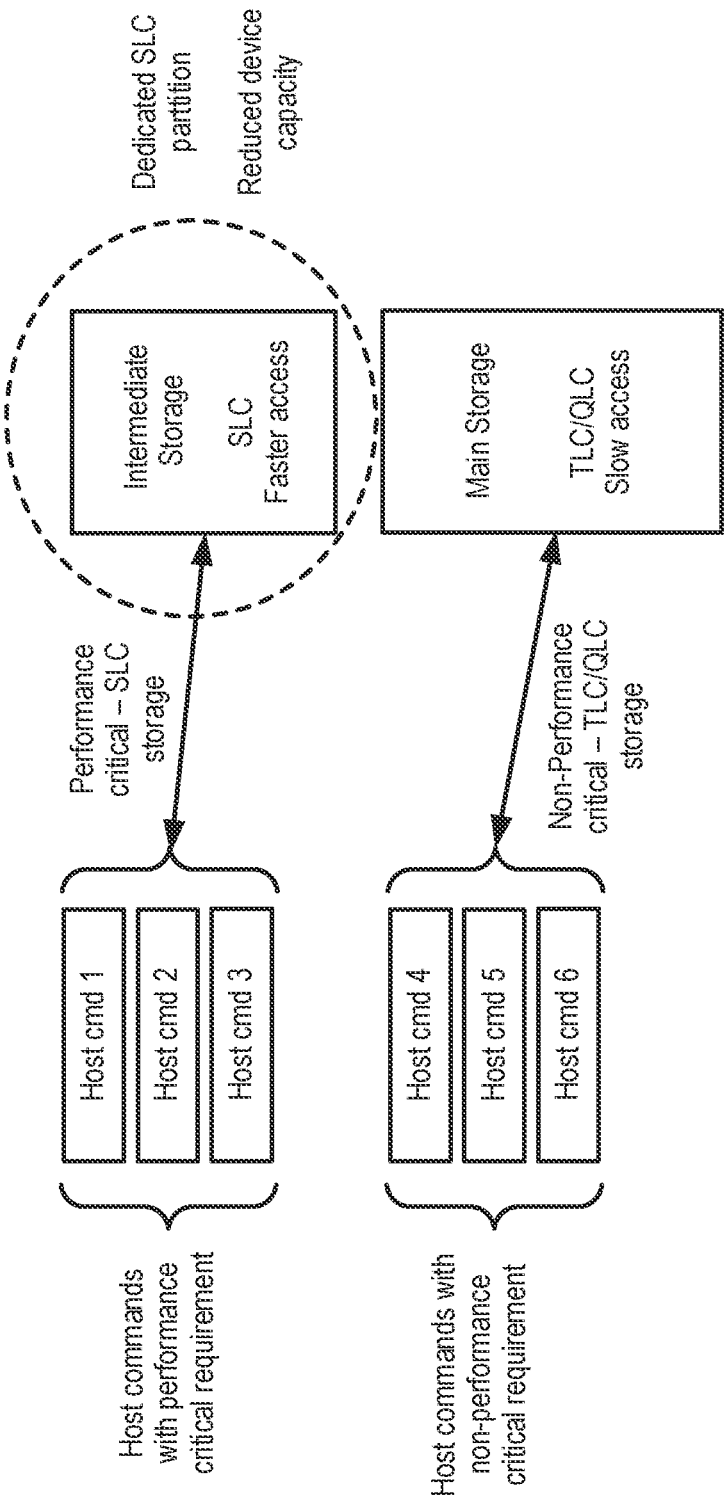
FIG. 7 is a diagram that illustrates a host of an embodiment allotting performance-critical data into dedicated single-level cell (SLC) partitions.

FIG. 6 is an illustration of an intermediate storage area. As shown in FIG. 6, the intermediate storage area is allocated with SLC blocks and is used to hold frequently-used host data. When the host is requesting a certain range of data repeatedly, such data will be moved from TLC/QLC storage to intermediate SLC storage. Any further host accesses to that range of data will be read from the SLC storage. Though this helps in turn-around time, a data storage device may have to pay a penalty in terms of block budgeting, as SLC blocks are dedicatedly used and lead to lower device capacity. FIG. 7 illustrates a host allotting performance-critical data into a dedicated SLC partition.

In other architectures, the host, at the time of data write, would instruct the data storage device that a certain range of data is performance critical. The data storage device can have a data management scheme to store such host performance-critical data in SLC blocks, so that access time will be short. However, this comes with a limitation that dedicated SLC blocks (instead of TLC/QLC blocks) are budgeted and would decrease overall storage device capacity. For example, dedicated partitions can be allotted for accumulating host-critical data, and, in solid-state drives (SSDs), a boot partition can be maintained for faster access.

The following embodiments provide another approach. In general, some of these embodiments provide a host-defined dynamic data caching/pre-fetch scheme where the host indicates a set/range of data in a low-priority speculative read command. The data storage device works on accumulating data at a lower host throughput or during device idle times. Such data accumulation is extendable to a host-managed buffer as a host-desirable option. With these embodiments, the host can interact with the data storage device with its data requirement ranges in advance through a low-priority speculative read command, which would provide the data storage device with time to build data that the host access. This overcomes the dedicated SLC partitions requirement noted above.

The following embodiments provide example implementations involving: (a) a new low-priority speculative host read command, (b) a dynamic data accumulation scheme using non-persistent pre-fetch buffers, and (c) a method for utilizing idle time and surplus device throughput for dynamic data accumulation. It should be noted that any of the disclosed features can be used alone or in combination. Further, embodiments described below are merely examples, and other implementations can be used. Accordingly, the details presented herein should not be read into the claims unless expressly recited therein.

In this embodiment, the host 300 informs the data storage device 100 of a desirable data range that it wants cached. The host 300 communicates this to the data storage device 100 via a new speculative read command, which the controller 102 of the data storage device 100 treats as low priority. As such, the command does not impact the write/read latency of regular (i.e., non-speculative) commands, as it can be executed either during the data storage device's idle time or by utilizing surplus device bandwidth. The cached data can be stored in a buffer in the data storage device 100 and/or in the host 300 (e.g., in a host memory buffer (HMB)), and the command can be executed based on the availability of the buffer(s).

While prior schemes of data accumulation work on command hysteresis, these embodiments dynamically accumulate data in advance using the low-priority speculative host read command, which is more effective in data storage devices where the range of data access from the host varies a lot during its operation. Terms of traditional read timeout factors may not apply for this read as such commands can span across host/device idle times without execution and possible no buffer allocations. Further, there may not be a commitment from the data storage device 100 as to when the command will be selected for execution, if at all. And with execution priority being low, completion times of speculative read commands are non-deterministic (e.g., a speculative read command does not need to be completed within a certain time or even at all, as the command can be without certain bounds and conditions). Additionally, if a specified logical block address (LBA) range is required immediately, the host 300 can convert a speculative command to a regular, non-speculative read command through a read attribute update. The host 300 can also invalidate a speculative read and queue a regular, non-speculative read command for same data range.

Figure 8:
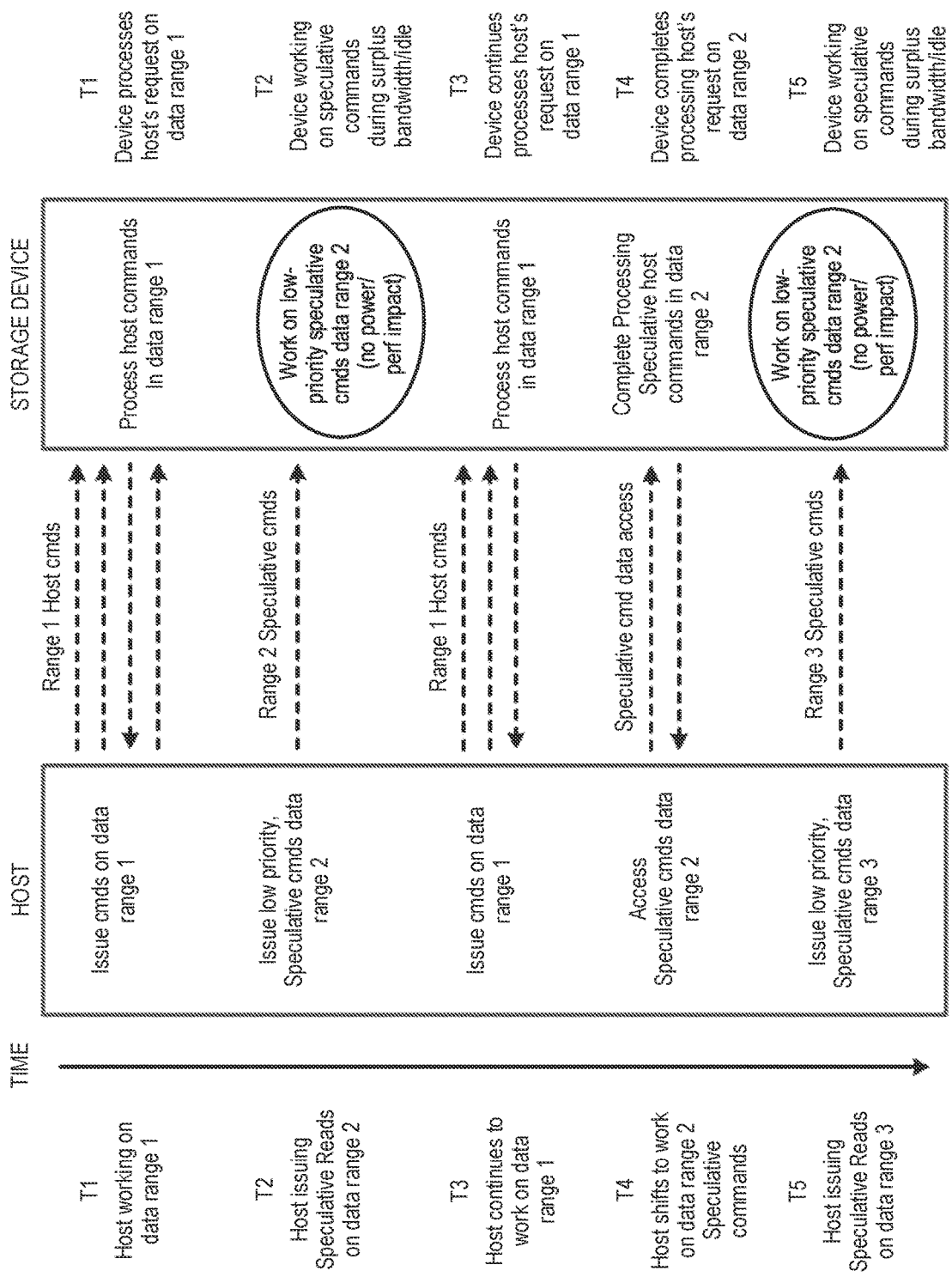
FIG. 8 is a diagram illustrating a low-priority speculative read command of an embodiment.

Turning again to the drawings, FIG. 8 is a flow diagram that illustrates the use of the low-priority speculative read command. This example illustrates the dynamism of data ranges that the host 300 can work on at different points of time. At time T1, the host 300 is working on data range 1. The host 300 issues read commands to the data storage device 100, which processes them in data range 1. At time T2, the host 300 issues a low-priority speculative read command to the data storage device 100 on data range 2. Because the command is low priority, the controller 102 of the data storage device 100 does not need to execute it right away or even at all. Instead, the controller 102 can work on the command when it determines that execution of the speculative read command, in whole or in part, will not reduce performance of the data storage device 100. Because execution of the command is not immediately required and can be performed at some later point in time, the low turn-around time gives the controller 102 the flexibility to execute the command without impacting on-going commands.

The controller 102 can determine if/when to at least partially execute the speculative read command in any suitable way. For example, such determination can include determining whether executing the speculative read command will increase latency of other commands, have a power impact or performance impact on the controller 102; and/or determining whether the data storage device 100 is at full throughput, is in or going to be in an idle state, has extra bandwidth, has no pending current host tasks, or has no internal maintenance tasks to work on. Of course, these are merely examples, and other determination techniques can be used.

At time T3, the host 300 continues to work on data range 1, which it was working on earlier. However, the controller 102 intermittently works on the low-priority speculative read command for data range 2, accumulating the requested data in a buffer without compromising performance required for data range 1. At time T4, the host 300 accesses the data stored in the buffer. As the controller 102 would not have to read that data from the memory 104, latency is reduced or will be minimal. At time T5, the host 300 issues a low-priority speculative read to the data storage device 100 for data range 3, and the process continues as above. It should be noted that it is possible that the controller 102 may not have time to even partially execute the low-priority speculative read command. In that case, no data is buffered.

Figure 9A:
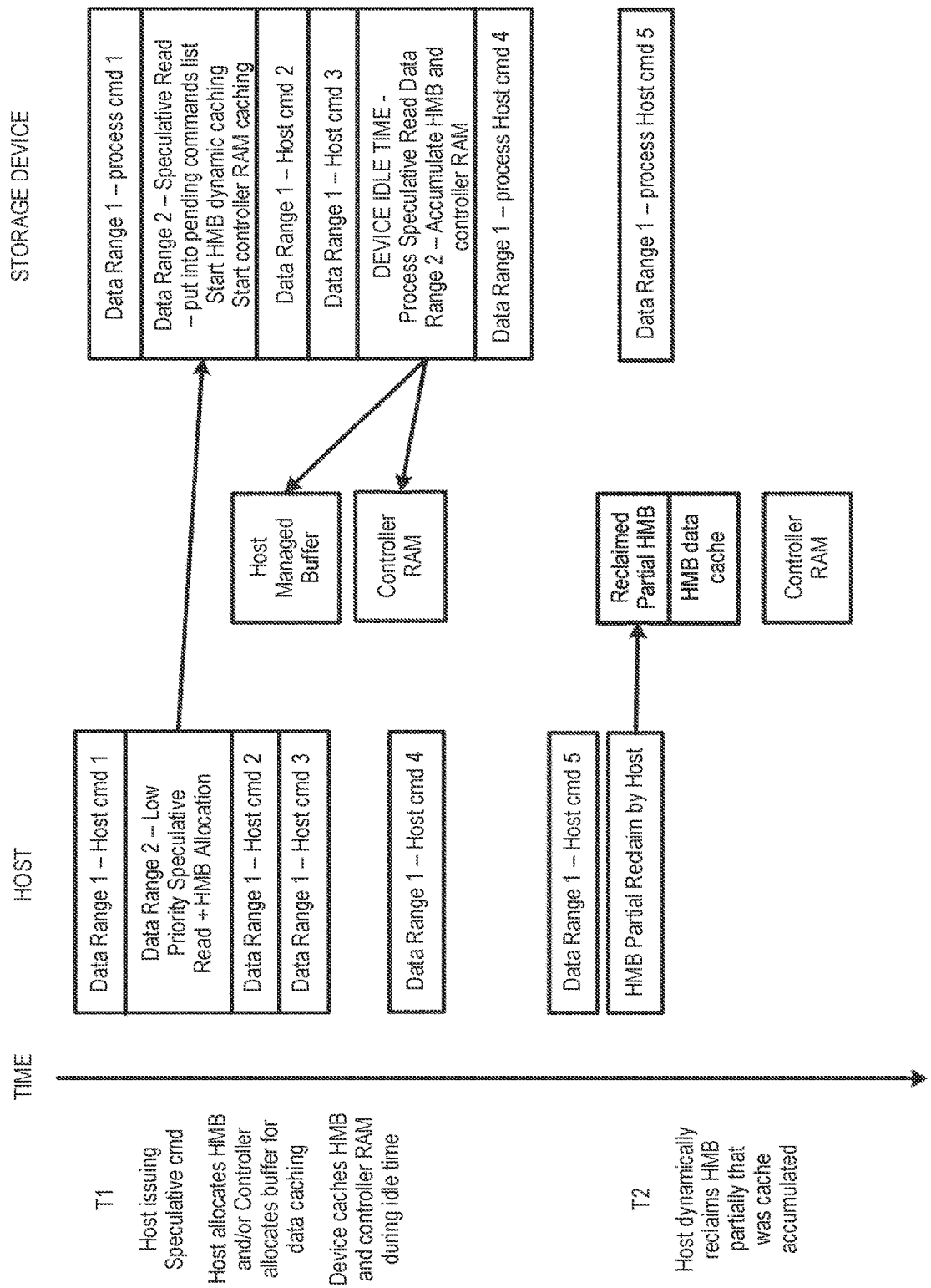
FIGS. 9A and 9B are diagrams illustrating a dynamic data buffer allocation and re-allocation-with-time method of an embodiment.
Figure 9B:
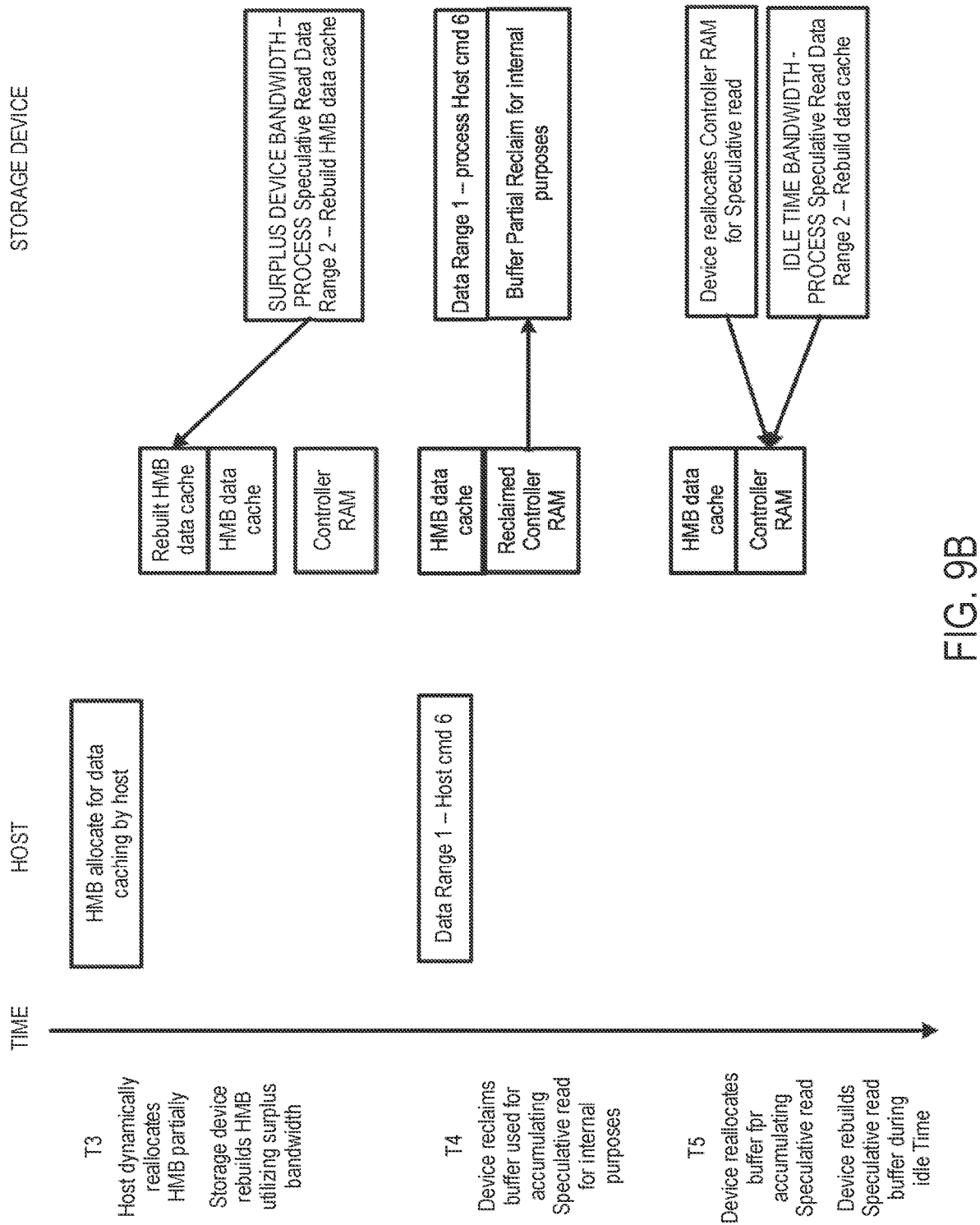

Another embodiment involves speculative read dynamic data accumulation/re-accumulation using a non-persistent pre-fetch buffer. As mentioned above, the data read from the low-priority speculative read command can be stored in a buffer in the data storage device 100 (e.g., in the controller 102 or in another location in the data storage device 100) and/or in a buffer in the host 300 (e.g., a host memory buffer (HMB)). FIGS. 9A and 9B illustrate dynamic data buffer allocation and re-allocation with time. It should be noted that these figures illustrate merely one example and that an effective host-to-device synchronization/coherence mechanism can be implemented to re-claim and re-allocate the HMB.

As shown in FIG. 9A, the host 300 issues a low-priority speculative read command to the data storage device 100 at time T1. The controller 102 can perform the low-priority speculative read command if and when it has idle time or extra bandwidth, or using other metrics, including, but not limited to, the other metrics described above. The execution of the command can also be based on the availability of the buffer in the data storage device 100 and/or host 300, in which case the controller 102 accumulates the requested data based on a host-workload-to-device-throughput ratio and pending internal maintenance operations. As mentioned above, the controller 102 may not have time to read all or even any of the logical block addresses identified in the logical block address range in the speculative read command. That is, in some embodiments, the controller 102 does not guarantee completion/full accumulation of the indicated data range of the speculated read command but will work on building the data range when/if possible without impacting system throughput during regular command execution. However, whatever data the controller 102 can read can help improve data storage device throughput.

When a host buffer is used, the controller 102 can start accumulating data in the host buffer, when it is available, without affecting the current host throughput and can intelligently utilize surplus device throughput. As a result, when the host 300 is in-need of the data, the data will be immediately available. However, the host 300 may not guarantee that it will block memory for data accumulation. Also, the controller 102 and/or host 300 may need to reclaim its respective buffer for internal purposes. (The host 300 may typically not have access to an HMB used by the data storage device 100 but may be given access through pointer swapping. Synchronization techniques can be used to avoid a potential race condition in which the data storage device 100 starts direct memory accessing into the HMB in order to complete the speculative read command, and the host 300 reclaims it at the same time.) In such cases, the cached data will be lost. However, when that portion of the buffer is reallocated, the controller 102 can dynamically rebuild that data range. This is shown at times T2-T5 in FIGS. 9A and 9B. Also, the controller 102 and/or host 300 may dynamically allocate more memory for data accumulation. In such cases, the controller 102 can continue to build data in the extended memory.

Figure 10:
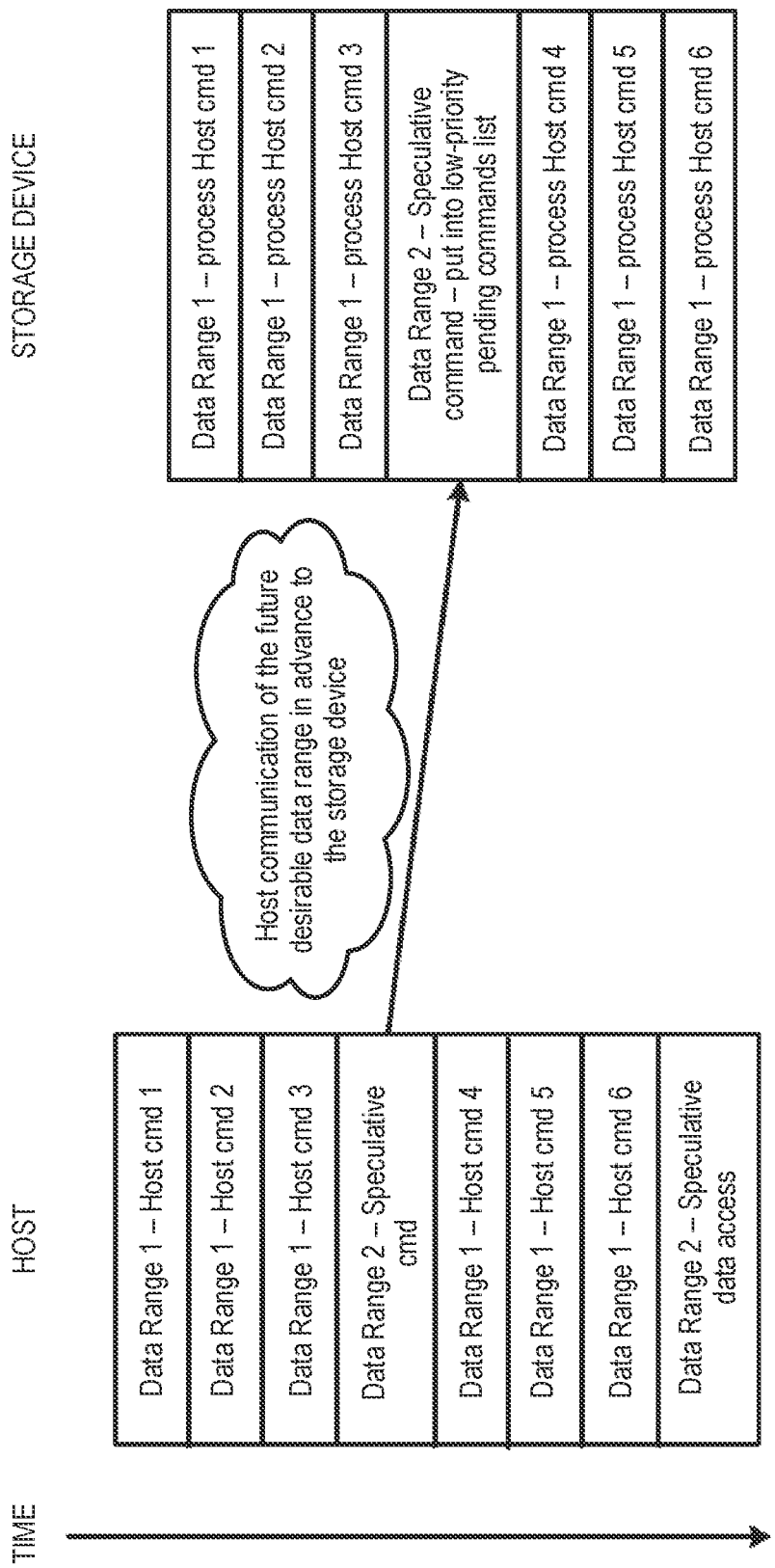
FIG. 10 is a diagram illustrating a data storage device of an embodiment fetching speculative read command data during idle time and using surplus bandwidth.

Another embodiment utilizes surplus data storage device throughput and data storage device idle time for dynamic data processing. As illustrated in FIG. 10, in one embodiment, the host-desired host command requests are put in low-priority pending execution queues, Such commands are executed when the controller 102 has no pending current host tasks or internal maintenance tasks to work on. The controller 102 may interleave speculated commands with ongoing commands if the controller 102 has surplus throughput to spare.

Such caching is also effectively achieved during a host idle scenario where the data storage device 100 usually goes to sleep. In case data desired by host is pending, the controller 102 can work on collecting the host data before going to low-power/sleep mode. However, if the host 300 is power conservative as in modern client architectures, such idle time pre-fetch of speculated commands may not be done. This ensures architecture expectation to reduce host active time. In other hosts, power management schemes may be developed to not turn off the part of the buffer allocated for speculated reads. Also, power management schemes may be extended to keep dynamic buffers powered to ensure data is retained through device sleep/low power modes. Host and data storage device architectures can work on power management schemes to detect pending speculative reads and keep minimal buffers active through low power states.

There are several advantages associated with these embodiments. For example, with these embodiments, device read performance can be enhanced as the host-desired speculative reads are executed during idle times or when the controller 102 is not completely loaded. This ensures that ongoing commands are unaffected in execution. As other examples, a low-priority speculative read command can provide more flexibility in terms of data storage device task scheduling and block budgeting. The utilization of surplus bandwidth compared to the static approach of storing frequently-accessed data in SLC buffers results in improved data storage device throughput. Further, these embodiments can improve block budgeting by effective utilization of memory capacity with TLC/QLC blocks when the data storage device throughput is high.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a non-volatile memory; and
   a processor configured to:
      receive a speculative read command from a host identifying a plurality of logical block addresses, wherein the speculative read command is not required to be executed within a certain amount of time or even at all; and
      partially execute the speculative read command in response to determining that such execution will not reduce performance of the data storage device and not in response to availability of at least one buffer;
      wherein:
         partially executing the speculative read command causes data associated with some of the plurality of logical block addresses to be read from the non-volatile memory and stored in the at least one buffer; and
         partially executing the speculative read command does not guarantee that the speculative read command will be completely executed.

2. The data storage device of claim 1, wherein the processor is further configured to allow the host to access the data stored in the at least one buffer.

3. The data storage device of claim 1, wherein the speculative read command is partially executed during idle time of the data storage device.

4. The data storage device of claim 1, wherein the speculative read command is partially executed in response to the data storage device having surplus bandwidth.

5. The data storage device of claim 1, wherein the speculative read command is partially executed in response to the at least one buffer being available.

6. The data storage device of claim 1, wherein the speculative read command is partially executed prior to the data storage device entering a low-power or sleep mode.

7. The data storage device of claim 1, wherein the processor is further configured to partially execute the speculative read command intermediately between executing non-speculative read commands.

8. The data storage device of claim 1, wherein the at least one buffer is in the data storage device.

9. The data storage device of claim 1, wherein the at least one buffer is in the host.

10. The data storage device of claim 1, wherein the at least one buffer comprises a plurality of buffers, one of which is in the data storage device and another one of which is in the host.

11. The data storage device of claim 1, wherein the processor is further configured to replace at least some portions of the data in the at least one buffer that are lost responsive to an area of the at least one buffer storing the at least some portions of the data being reclaimed.

12. The data storage device of claim 1, wherein the processor is further configured to place the speculative read command in a low-priority queue.

13. The data storage device of claim 1, wherein the non-volatile memory comprises a three-dimensional memory.

14. A method comprising:
    performing the following in a data storage device comprising a non-volatile memory:
       receiving a low-priority pre-fetch command from a host, wherein the low-priority pre-fetch command is not required to be executed within a certain amount of time or even at all;
       each time it is determined that the low-priority pre-fetch command can be executed in part without affecting performance of the higher-priority command, and not in response to availability of a volatile memory, partially executing a part of the low-priority pre-fetch command by:
          reading data from the non-volatile memory associated with the executed part; and
          caching the data in the volatile memory; and
       dynamically rebuilding lost data removed from the volatile memory after the data storage device or the host reclaims at least a portion of the volatile memory, wherein the data storage device or the host is allowed to reclaim the at least a portion of the volatile memory because full accumulation in the volatile memory of all of the data associated with the low-priority pre-fetch command is not guaranteed.

15. The method of claim 14, further comprising:
    in response to later receiving a read command from the host for data identified in the pre-fetch command, reading only data from the non-volatile memory that was not cached in the volatile memory.

16. The method of claim 14, wherein the volatile memory is located at least partially in the data storage device.

17. The method of claim 14, wherein the volatile memory is located at least partially in the host.

18. The method of claim 14, further comprising:
    converting the low-priority pre-fetch command into a higher priority read command in response to a request from the host.

19. The method of claim 14, further comprising:
    invalidating the low-priority pre-fetch command and replacing it with a higher priority read command in response to a request from the host.

20. A data storage device comprising:
    a non-volatile memory; and
    means for:
       receiving a speculative read command from a host identifying a plurality of logical block addresses, wherein the speculative read command is not required be to executed within a certain amount of time or even at all; and partially executing the speculative read command in response to determining that such execution will not reduce performance of the data storage device and not in response to availability of at least one buffer;

wherein:
- partially executing the speculative read command causes data associated with some of the plurality of logical block addresses to be read from the non-volatile memory and stored in at least one buffer; and
- partially executing the speculative read command does not guarantee that the speculative read command will be completely executed.

* * * * *